US009042830B2

(12) United States Patent
Brillhart et al.

(10) Patent No.: US 9,042,830 B2
(45) Date of Patent: *May 26, 2015

(54) INPUT DEVICE SWITCHING AN OPERATING CHANNEL OF A RADIO TRANCEIVER BETWEEN FIRST AND SECOND COMPUTER SYSTEMS

(71) Applicant: International Business Machines Corporation, Armonk, NY (US)

(72) Inventors: David C. Brillhart, Orlando, FL (US); Christopher J. Dawson, Arlington, VA (US); Nicholas J. Karels, Aurora, IL (US); James W. Seaman, Falls Church, VA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/169,878

(22) Filed: Jan. 31, 2014

(65) Prior Publication Data

US 2014/0148105 A1 May 29, 2014

Related U.S. Application Data

(63) Continuation of application No. 12/854,548, filed on Aug. 11, 2010, now Pat. No. 8,682,249.

(51) Int. Cl.
*H04B 7/15* (2006.01)
*G06F 3/023* (2006.01)
*G06F 3/01* (2006.01)

(52) U.S. Cl.
CPC ............... *H04B 1/401* (2013.01); *G06F 3/023* (2013.01); *G06F 3/01* (2013.01)

(58) Field of Classification Search
CPC ....... G06F 3/023; G06F 3/0231; G06F 1/266; G06F 2203/0382; G06F 3/0227; G06F 3/1423; G06F 3/1454; H04L 41/069; H04L 41/0803; H04L 29/00; H04L 67/12
USPC ......... 345/156, 157, 168, 204, 213, 547, 634; 348/211.7, 218.1, 569, 705; 370/221, 370/352, 386, 419; 455/90.3, 512, 515
See application file for complete search history.

(56) References Cited

U.S. PATENT DOCUMENTS

| | | | |
|---|---|---|---|
| 4,905,302 | A | 2/1990 | Childress et al. |
| 6,806,866 | B2 | 10/2004 | Benayoun et al. |

(Continued)

FOREIGN PATENT DOCUMENTS

| | | |
|---|---|---|
| JP | 11272409 | 10/1999 |
| TW | 578084 | 3/2004 |

(Continued)

OTHER PUBLICATIONS

Wikipedia KVM switch http://en.wikipedia.org//wiki/KVM_switch Accessed Apr. 22, 2010 (5 pages).

*Primary Examiner* — Golam Sorowar

(74) *Attorney, Agent, or Firm* — Mark Vallone, Esq.; Rachel L. Pearlman, Esq.; Heslin Rothenberg Farley & Mesiti P.C.

(57) ABSTRACT

An input device for switchable use between first and second computer systems. A controller of the input device can execute switching logic to direct a radio transceiver of the input device to switch an operating channel of the radio transceiver to a first channel monitored by the first computer system in response to a first event, and thereby, the input device can be utilized to insert data into the first computer system. The controller can execute switching logic to direct the radio transceiver to switch the operating channel to a second channel monitored by the second computer system in response to a second event, and thereby, the input device can be utilized to insert data into the second computer system.

9 Claims, 11 Drawing Sheets

(56) References Cited

U.S. PATENT DOCUMENTS

| | | |
|---|---|---|
| 7,496,697 B2 | 2/2009 | Sween et al. |
| 7,512,704 B2 | 3/2009 | Nelson et al. |
| 2003/0037130 A1 | 2/2003 | Rollins |
| 2005/0027890 A1 | 2/2005 | Nelson et al. |
| 2006/0244724 A1* | 11/2006 | Erickson ............ 345/163 |
| 2007/0197206 A1 | 8/2007 | Olson et al. |
| 2007/0297442 A1 | 12/2007 | Chang et al. |
| 2008/0212820 A1 | 9/2008 | Park |
| 2008/0227412 A1 | 9/2008 | Binowski et al. |
| 2009/0016380 A1 | 1/2009 | Gupta et al. |
| 2009/0077282 A1* | 3/2009 | Hsueh ............ 710/63 |
| 2009/0094395 A1 | 4/2009 | Shen |
| 2009/0189863 A1* | 7/2009 | Liu ............ 345/168 |
| 2009/0307612 A1 | 12/2009 | Singh et al. |
| 2010/0083122 A1* | 4/2010 | Kozloski et al. ............ 715/737 |

FOREIGN PATENT DOCUMENTS

| | | |
|---|---|---|
| TW | 277305 | 3/2007 |
| WO | WO 2010108036 | 9/2010 |

\* cited by examiner

US 9,042,830 B2

INPUT DEVICE SWITCHING AN OPERATING CHANNEL OF A RADIO TRANCEIVER BETWEEN FIRST AND SECOND COMPUTER SYSTEMS

CROSS REFERENCE TO RELATED APPLICATIONS

The present application is a Continuation application of U.S. Non-Provisional application Ser. No. 12/854,548 filed on Aug. 11, 2010. The prior application is incorporated herein by this reference and the benefit of its filing date is claimed herein as well.

BACKGROUND

The present invention relates to input devices, and more specifically, to input devices having radio transceivers.

Many settings exist wherein computer system users require the simultaneous use of multiple computer systems. For example, in a call center offering technical support services, a support specialist may be stationed at a desk with a first computer system for use in creating and managing customer call records and a second computer system for use in performing research over the Internet to diagnose and solve the callers' presented technical problems. The support specialist's supervisor may be stationed at a similarly equipped desk, but may also use the computer systems at the support specialist's desk from time to time to assist the support specialist in handling a call. Typically, a separate set of input devices is connected to each computer system. Thus, in the call center example, there may be two sets of input devices on the support specialist's desktop and on the support supervisor's desktop. The term "input device" is used herein to refer to a device that can be utilized to insert data into a computer system. Examples of an input device include a mouse, a keyboard, a track ball, a scanner, and a microphone.

SUMMARY

According to one embodiment of the present invention, an input device is provided for switchable use between first and second computer systems. The input device comprises a radio transceiver having an operating channel, an input mechanism, and a controller communicatively coupled to the radio transceiver and the input mechanism, the controller being configured to execute switching logic to direct the radio transceiver to switch the operating channel to a first channel monitored by the first computer system in response to a first event, the controller being further configured to execute the switching logic to direct the radio transceiver to switch the operating channel to a second channel monitored by the second computer system in response to a second event. The input device can be utilized to insert data into the first computer system in response to the radio transceiver switching the operating channel to the first channel, and the input device can be utilized to insert data into the second computer system in response to the radio transceiver switching the operating channel to the second channel.

According to another embodiment of the present invention, a computer system is provided for switching an operating channel of a radio transceiver. The computer system comprises the radio transceiver, a controller, and a computer readable storage medium. The computer system further comprises first program instructions to determine whether an event detected by the controller is a first event or a second event, second program instructions to direct the radio transceiver to switch the operating channel to a first channel monitored by a first system in response to determining that the event is the first event, and third program instructions to direct the radio transceiver to switch the operating channel to a second channel monitored by a second system in response to determining that the event is the second event. The first, second, and third program instructions are stored on the computer readable storage medium for execution by the controller.

According to another embodiment of the present invention, a computer program product is provided for switching an operating channel of a radio transceiver of an input device. The input device further comprises a controller communicatively coupled to the radio transceiver. The computer program product comprises a computer readable storage medium, first program instructions to determine whether an event detected by the controller is a first event or a second event, second program instructions to direct the radio transceiver to switch the operating channel to a first channel monitored by a first computer system in response to determining that the event is the first event, and third program instructions to direct the radio transceiver to switch the operating channel to a second channel monitored by a second computer system in response to determining that the event is the second event. The first, second, and third program instructions are stored on the computer readable storage medium.

DETAILED DESCRIPTION

Figure 1A:
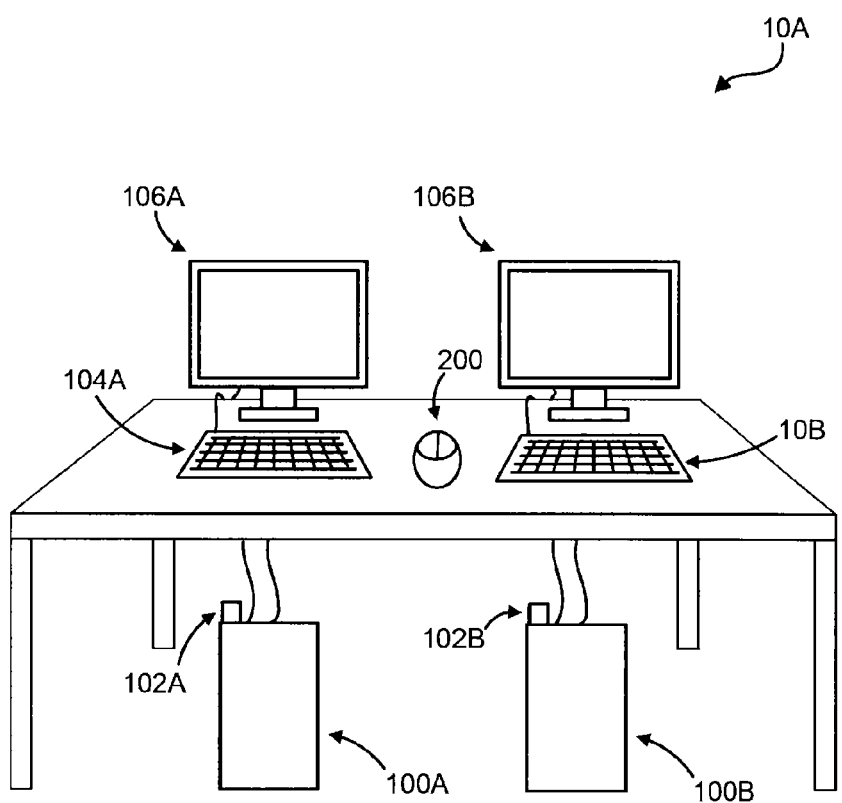
FIGS. 1A-1B are illustrations of systems according to embodiments of the present invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Embodiments of the present invention are directed toward an input device. The input device can have a controller and a radio transceiver. The radio transceiver can have an operating channel. The controller can execute switching logic to direct the radio transceiver to switch the operating channel to a first channel monitored by a first computer system in response to a first event, and thereby, the input device can be utilized to insert data into the first computer system. The controller can execute switching logic to direct the radio transceiver to switch the operating channel to a second channel monitored by a second computer system in response to a second event, and thereby, the input device can be utilized to insert data into the second computer system. As the input device can be shared among the first and second computer systems, the amount of work space cluttered by input devices for use with a single computer system can be advantageously reduced.

In systems known to the present inventors, a single keyboard, display device, and mouse can be shared among first and second computer systems through the use of a keyboard-video-mouse (KVM) switch. The first and second computer systems, keyboard, display device, and mouse can each be connected by separate cables to separate ports of the KVM switch. In this configuration, the KVM switch serves as a proxy between the input devices, the display device, and the first and second computer systems. By engaging a switch or buttons on the KVM switch a first time, the KVM switch terminates signals between the first computer system and the keyboard, display device, and mouse, and establishes new signals between the second computer system and the keyboard, display device, and mouse. By engaging the switch or buttons on the KVM switch a second time, the KVM switch terminates signals between the second computer system and the keyboard, display device, and mouse, and establishes new signals between the first computer system and the keyboard, display device, and mouse. As a result of the switching, the display device screen may blink while adjusting to differing synchronization frequencies of the first and second computer systems. The time that it takes to switch between the first and second computer systems and for the display device to adjust may be a noticeable delay to users. Further, in settings where users require real-time viewing of multiple display device screens, multiple KVM switches may be required, and each KVM switch may require its own set of input devices.

An input device according to embodiments of the present invention addresses these issues. As the input device can switch the operating channel of the radio transceiver to a first channel monitored by the first computer system in response to a first event and to a second channel monitored by the second computer system in response to a second event, no KVM switch is needed for the input device to be shared among the first and second computer systems. Moreover, because the input device does not terminate or establish signals between a display device and a computer system, there is no switching delay resulting from a display devices' adjustment to a different synchronization frequency.

Figure 1B:
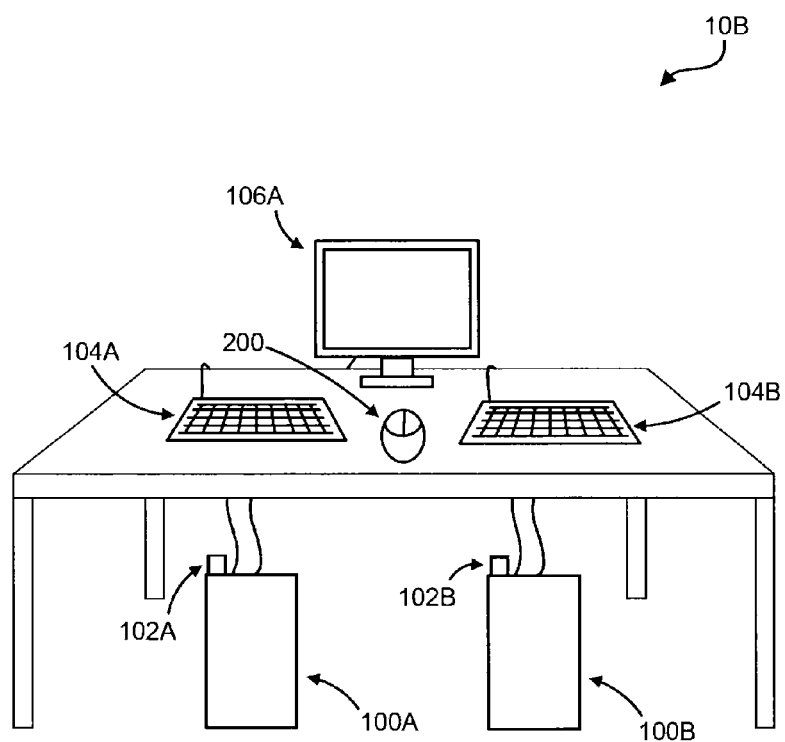

FIGS. 1A-1B illustrate two examples of suitable systems 10A and 10B, respectively, on which embodiments of the present invention can be implemented. Systems 10A and 10B are only two examples of such suitable systems, and are not intended to suggest any limitation as to the scope of use or functionality of the present invention. Shown in FIGS. 1A-1B are computer systems 100A and 100B. Computer systems 100A and 100B can have radio transceivers 102A and 102B and keyboards 104A and 104B, respectively. While in FIG. 1A, computer systems 100A and 100B are communicatively coupled to display devices 106A and 106B, respectively, in FIG. 1B, computer systems 100A and 100B are both communicatively coupled to display device 106A. Also shown in FIGS. 1A-1B is input device 200 on which embodiments of the invention can be implemented. In FIGS. 1A-1B, input device 200 is depicted as a wireless mouse, however, one of skill in the art will appreciate that input device 200 can take other forms. Input device 200 can communicate with computer systems 100A and 100B via radio transceivers 102A and 102B, respectively, using a wireless communication technology such as Bluetooth, IEEE 802.11, Wireless USB, Zig-Bee, or Z-Wave. Radio transceivers 102A and 102B can be connected to a USB or other port of computer systems 100A and 100B, respectively, or can alternatively be internal to computer systems 100A and 100B, respectively.

Figure 2A:
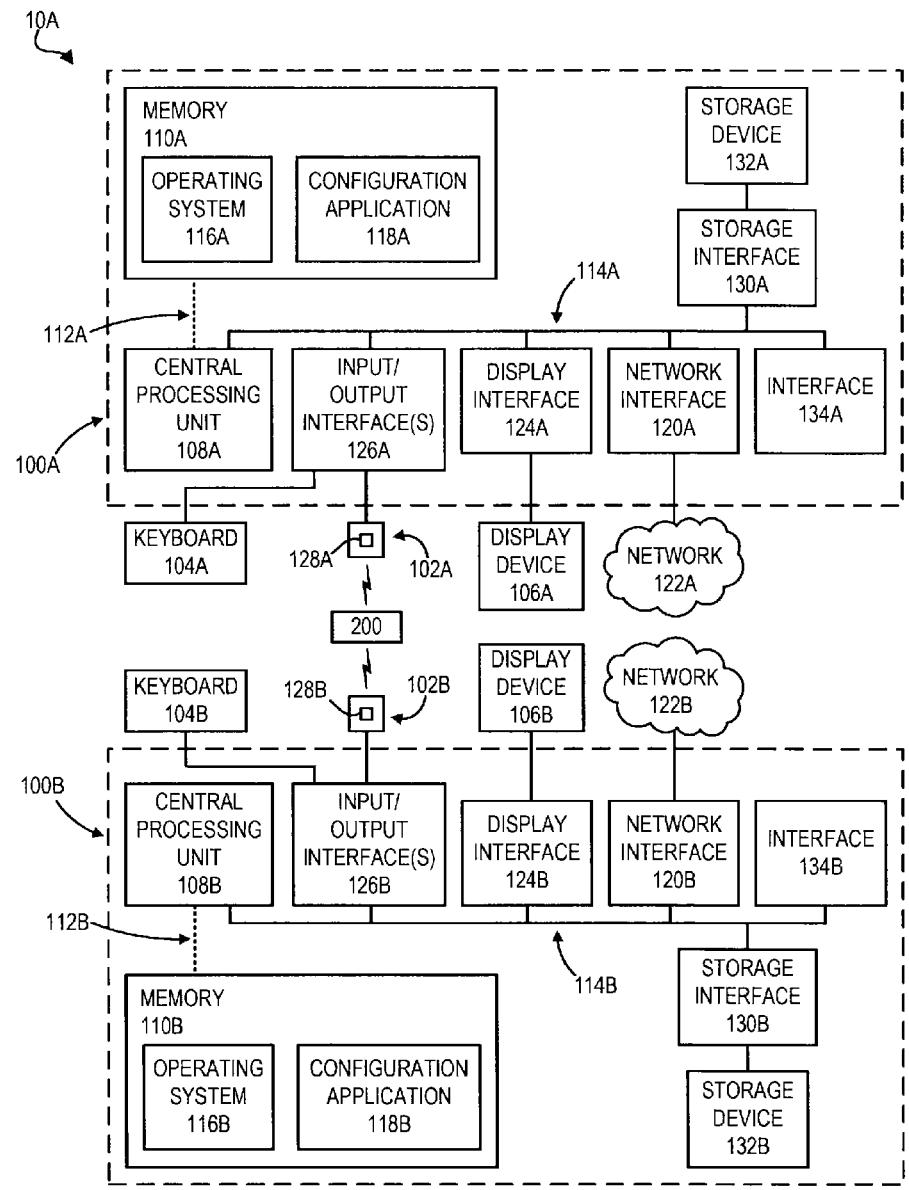
FIGS. 2A-2B are hardware overviews of systems according to embodiments of the present invention.
Figure 2B:
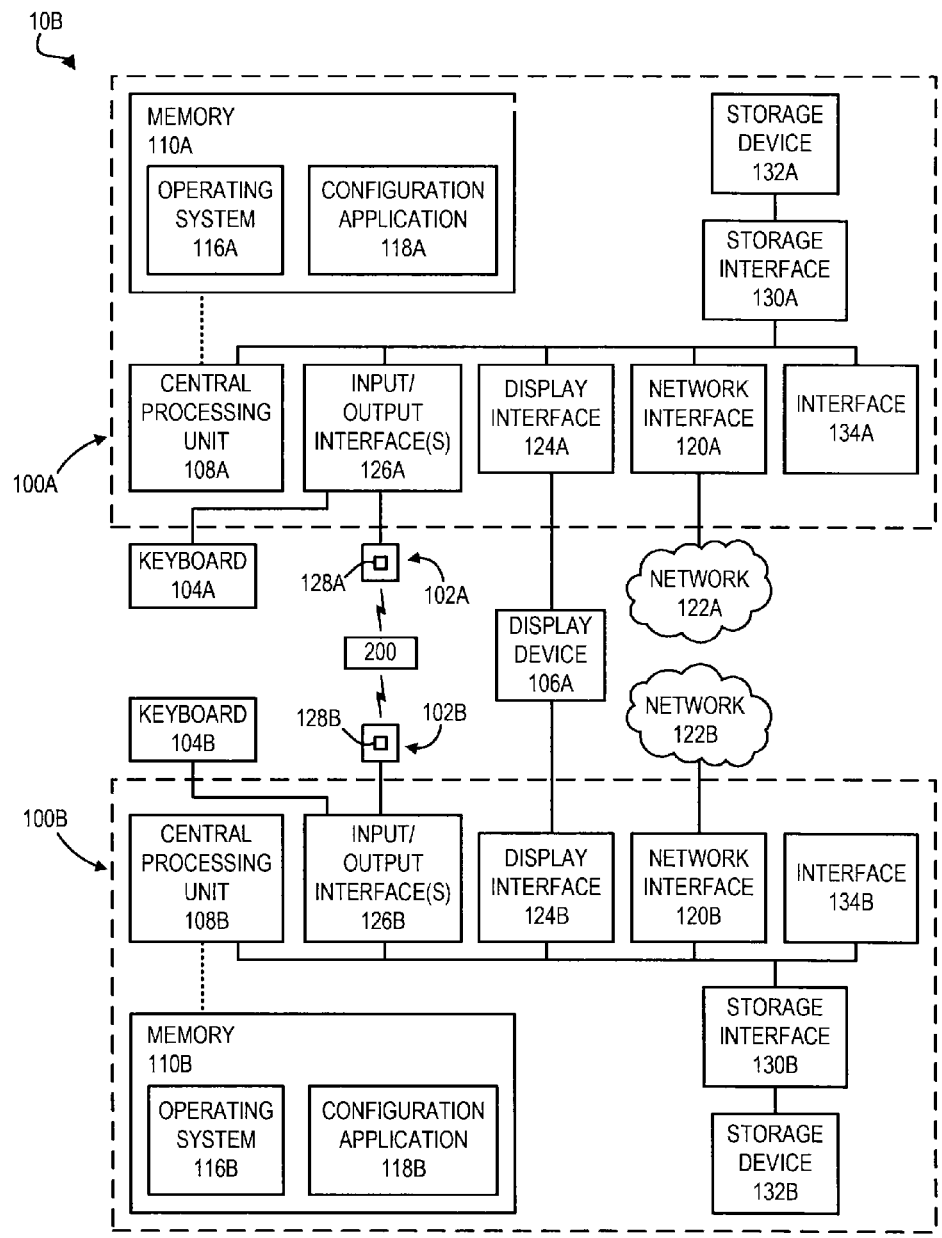

FIGS. 2A-2B are block diagrams of system 10A of FIG. 1A and system 10B of FIG. 1B, respectively. Depicted computer systems 100A and 100B can have central processing units (CPUs) 108A and 108B, which can be programmable processors for executing programmed instructions stored in memories 110A and 110B, respectively. CPUs 108A and 108B can be reduced instruction set (RISC) microprocessors such as IBM® PowerPC® processors, x86 compatible processors such as Intel® Pentium® processors, Advanced Micro Devices® Athlon® processors, or any other suitable processors. IBM and PowerPC are trademarks or registered trademarks of International Business Machines Corporation in the United States, other countries, or both. Intel and Pentium are trademarks or registered trademarks of Intel Corporation or its subsidiaries in the United States, other countries, or both. Advanced Micro Devices and Athlon are trademarks or registered trademarks of Advanced Micro Devices, Inc. or its subsidiaries in the United States, other countries, or both. In other embodiments, CPUs 108A and 108B can each comprise one or more CPUs distributed across one or more locations, e.g., on a client and server.

CPUs 108A and 108B can be connected to memories 110A and 110B, respectively, through dedicated system buses 112A and 112B, respectively, and/or general system buses 114A and 114B, respectively. Memories 110A and 110B can be random access semiconductor memories for storing application data for processing. Memories 110A and 110B are depicted conceptually as single monolithic entities. However, in other embodiments, memories 110A and 110B can also be arranged in a hierarchy of caches and in other memory devices, in a single physical location, or distributed across a plurality of physical systems in various forms. Memories 110A and 110B can include hard disk, tape, or other storage media. FIGS. 2A-2B illustrate that operating systems 116A and 116B and configuration applications 118A and 118B can be stored in memories 110A and 110B, respectively.

Operating systems 116A and 116B can provide functions such as device interface management, memory management, and multiple task management. Operating systems 116A and 116B can be Unix based operating systems such as the IBM® AIX® operating system, non-Unix based operating systems such as the Microsoft® Windows® family of operating systems, network operating systems such as Sun Microsystems® JavaOS®, or any other suitable operating systems. IBM and AIX are trademarks or registered trademarks of International Business Machines Corporation in the United States, other countries, or both. Microsoft and Windows are trademarks or registered trademarks of Microsoft Corporation in the United States, other countries, or both. Sun Microsystems and Java and all Java-based trademarks and logos are trademarks of Sun Microsystems, Inc. in the United States, other countries, or both. CPUs 108A and 108B can be suitably programmed to read, load, and execute instructions of operating systems 116A and 106B, respectively. CPUs 108A and 108B can also be suitably programmed to read, load, and execute instructions of configuration applications 118A and 118B, respectively, as described in greater detail below. Other programs (not shown) can include server software applications in which network interfaces 120A and 120B, respectively, interact with the server software applications to enable computer systems 100A and 100B, respectively, to function as network servers via networks 122A and 122B, respectively.

General system buses 114A and 114B can support transfer of data, commands, and other information between various subsystems of computer systems 100A and 100B, respectively. While shown in simplified form as single buses, general system buses 114A and 114B can each be structured as multiple buses arranged in hierarchical form. While in FIG. 2A, display interfaces 124A and 124B support display devices 106A and 106B, respectively, in FIG. 2B, display interfaces 124A and 124B support display device 106A. Display devices 106A and 106B can be cathode-ray tube displays or displays based upon other suitable display technology.

Each of computer systems 100A and 100B can have one or more input/output interfaces 126A and 126B, respectively. Radio transceiver 102A can be connected to one of input/output interfaces 126A, and radio transceiver 102B can be connected to one of input/output interfaces 126B. Radio transceivers 102A and 102B can monitor frequency channels 128A and 128B, respectively, for communications from devices external to computer systems 100A and 100B, respectively, such as input device 200. Keyboard 104A can be connected to another of input/output interfaces 126A, and keyboard 104B can be connected to another of input/output interfaces 126B.

Storage interfaces 130A and 130B can support one or more storage devices 132A and 132B, respectively. Storage devices 132A and 132B can include magnetic hard disk drives or CD-ROMs, although other types of data storage devices can be used, including removable media. Interfaces 134A and 134B can be used for operationally connecting various types of peripheral devices to computer systems 100A and 100B, respectively, via general system buses 114A and 114B, respectively, such as printers and bus adapters. Network interfaces 120A and 120B can provide a physical interface to networks 122A and 122B, which can be local area networks (LANs) or the Internet. Networks 122A and 122B can be the same or different physical networks. Network interfaces 120A and 120B can be any type of adapters that provide an interface between computer systems 100A and 100B, respectively, and networks 122A and 122B, respectively, such as modems that can be connected to a transmission system such as a telephone line, Ethernet adapters, or Token Ring adapters. Computer systems 100A and 100B can be connected to network servers via a LAN using an appropriate network protocol and the network server that can in turn be connected to the Internet.

As shown in FIGS. 1A-1B and FIGS. 2A-2B, input device 200 can communicate with computer systems 100A and 100B via radio transceivers 102A and 102B, respectively. Input device 200 can encode its movement across a desktop or other surface into data, which can be modulated into RF signals and transmitted to one or more radio transceivers 102A and 102B. Similarly, engagements of an input mechanism 210 (shown in FIG. 3), e.g., actuations of a key or mouse button, on input device 200 can also be converted into data for input into one of computer system 100A and 100B and can be transmitted via modulated RF signals to one of radio transceivers 102A and 102B. Radio transceivers 102A and 102B, via input/output interfaces 126A and 126B, respectively, can convey this data via general system buses 114A and 114B, respectively, to CPUs 108A and 108B, respectively. CPUs 108A and 108B can convert this data under the direction of operating systems 116A and 116B, respectively and/or other application programs, into cursor or other screen movement, screen object selection, or other program events. Radio transceivers 102A and 102B can also transmit data to input devices 200 via modulated RF signals. There can be two-way wireless communications between computer system 100A and input device 200 and between computer system 100B and input device 200. Because computer systems 100A and 100B can transmit data to input device 200, computer systems 100A and 100B can transmit data to input device 200 to configure components of input device 200, e.g., via configuration applications 118A and 118B, respectively.

Figure 3:
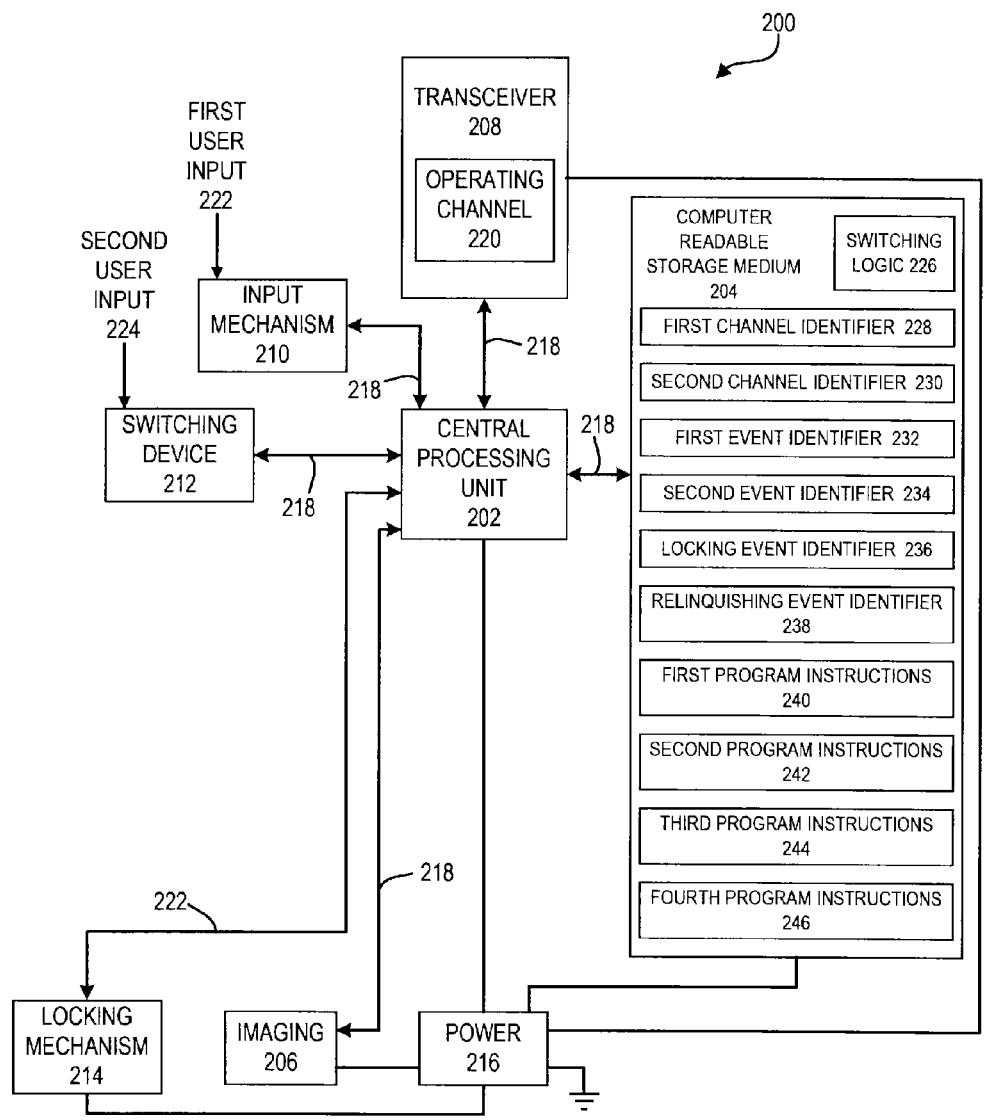
FIG. 3 is a hardware overview of an input device according to an embodiment of the present invention.

FIG. 3 is a block diagram of the internal circuitry of an input device 200 according to one embodiment of the present invention. Input device 200 can comprise controller 202, computer readable storage medium 204, imaging elements 206, radio transceiver 208, input mechanism 210, switching device 212, locking mechanism 214, and power source 216. Power source 216 can power the various electrical components of input device 200 and can include one or more batteries. Controller 202 can control operation of input device 200. Although controller 202 is shown as a CPU, controller 202 can alternatively include state machine circuitry or other suitable components capable of controlling operation of input device 200 as described herein. Controller 202 can communicate with computer readable storage medium 204, imaging elements 206, which can include an imaging array, radio transceiver 208, input mechanism 210, switching device 212, and locking mechanism 214 over one or more buses 218, shown collectively as bi-directional arrows. Although FIG. 3 shows controller 202, computer readable storage medium 204, imaging elements 206, radio transceiver 208, input mechanism 210, switching device 212, and locking mechanism 214 as discrete components, this need not be the case. For example, one or more of these components can be contained in a single integrated circuit (IC) or other component. As another example, controller 202 can include internal program memory such as ROM. Similarly, the herein described functions of these components can be distributed across additional components (e.g., multiple controllers or other components).

Controller 202 can control imaging elements 206 and radio transceiver 208. Controller 202 can pass data to radio transceiver 208 for communication to computer systems 100A and 100B via operating channel 220. Similarly, data communicated to input device 200 from one or more of computer systems 100A and 100B can be received via radio transceiver 208 and transmitted to controller 202.

Controller 202 can receive electrical signals from input mechanism 210 that correspond to a first user input 222. Input mechanism 210 can be, e.g., a mouse button or a keyboard key attached to input device 200. First user input 222 can be, e.g., engagement, actuation, or other movement of input mechanism 210. Controller 202 can also receive electrical signals from switching device 212 that correspond to a second user input 224. Switching device 212 can be, e.g., a joystick, a scroll wheel, a track ball, or a combination of keyboard keys. Second user input 224 can be, e.g., engagement, actuation, or other movement of switching device 212. Alternatively, input device 200 can be devoid of switching device 212, and controller 202 can receive electrical signals from input mechanism 210 that correspond to second user input 224.

Controller 202 can communicate with computer readable storage medium 204. Computer readable storage medium 204 can be, e.g., an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. Switching logic 226, a first channel identifier 228, a second channel identifier 230, a first event identifier 232, a second event identifier 234, a locking event identifier 236, a relinquishing event identifier 238, first program instructions 240, second program instructions 242, third program instructions 244, and fourth program instructions 246 can be stored in computer readable storage medium 204. Switching logic 226 can be implemented as software or, more particularly, firmware that, when executed, can switch or restrict the switching of operating channel 220. A user can configure first channel identifier 228, second channel identifier 230, first event identifier 232, second event identifier 234, locking event identifier 236, and relinquishing event identifier 238 via one or more of configuration applications 118A and 118B shown in FIGS. 2A-2B. First channel identifier 228 can identify frequency channel 128A monitored by radio transceiver 102A. Second channel identifier 230 can identify frequency channel 128B monitored by radio transceiver 102B.

First event identifier 232 can identify a first event (not shown) in response to which switching logic 226 can direct radio transceiver 208 to switch operating channel 220 to frequency channel 128A so that input device 200 can be utilized to insert data into computer system 100A. Alternatively, first event identifier 232 can identify a first event (not shown) in response to which switching logic 226 can determine whether first channel identifier 228 identifies operating channel 220 and, in response to determining that first channel identifier 228 does not identify operating channel 220, to direct radio transceiver 208 to switch operating channel 220 to frequency channel 128A so that input device 200 can be utilized to insert data into computer system 100A.

Second event identifier 234 can identify a second event (not shown) in response to which switching logic 226 can direct radio transceiver 208 to switch operating channel 220 to frequency channel 128B so that input device 200 can be utilized to insert data into computer system 100B. Alternatively, second event identifier 234 can identify a second event (not shown) in response to which switching logic 226 can determine whether second channel identifier 230 identifies operating channel 220 and, in response to determining that second channel identifier 230 does not identify operating channel 220, to direct radio transceiver 208 to switch operating channel 220 to frequency channel 128B so that input device 200 can be utilized to insert data into computer system 100B.

Locking event identifier 236 can identify a locking event (not shown) in response to which switching logic 226 can restrict one or more of switching operating channel 220 to frequency channel 128A in response to the first event and switching operating channel 220 to frequency channel 128B in response to the second event. In one embodiment, the locking event can be input device 200 detecting an occurrence of a certain time of day such that, e.g., operating channel 220 cannot be switched to frequency channel 128B after 5:00 pm, when the work shift of the primary user of input device 200 ends. In another embodiment, the locking event can be input device 200 detecting that one or more of computer system 100A and computer system 100B has not authorized the switching of operating channel 220 to frequency channel 128A or to frequency channel 128B, respectively. In another embodiment, the locking event can be input device 200 detecting the execution of a certain software process, e.g., a computer game, on one or more of CPUs 108A and 108B. In another embodiment, the locking event can be that an external device is communicatively coupled to one or more of computer system 100A via frequency channel 128A and computer system 100B via frequency channel 128B. For example, if input device 200 detects that the external device is communicatively coupled to computer system 100B via frequency channel 128B, switching logic 226 can restrict switching operating channel 220 to frequency channel 128B in response to the second event. In another embodiment, locking mechanism 214 can be used to determine an occurrence of the locking event. For example, locking mechanism 214 can be a finger print reader, and the locking event can be reading a fingerprint of an unauthorized user of input device 200 using locking mechanism 214.

Relinquishing event identifier 238 can identify a relinquishing event (not shown) in response to which switching logic 226 can direct radio transceiver 208 to switch operating channel 220 to a different frequency channel (not shown). In one embodiment, the relinquishing event can be receiving a signal from an external device. For example, the call center supervisor may have a high priority need for his external device, which can be an input device, to communicate with computer system 100A of the call center support specialist via frequency channel 128A. In response to the relinquishing event, switching logic 226 can direct radio transceiver 208 to switch operating channel 220 from frequency channel 128A to a different frequency channel so that the external device can communicate with computer system 100A via frequency channel 128A.

First program instructions 240 can determine whether an event detected by controller 202 is the first event or the second event. In one embodiment, first program instructions 240 can further comprise instructions to determine whether the event detected by the controller is relinquishing event 238. In another embodiment, first program instructions 240 can further comprise instructions to determine whether the event detected by the controller is locking event 236. Second program instructions 242 can direct radio transceiver 208 to switch operating channel 220 to frequency channel 128A in response to determining that the event is the first event. Third program instructions 244 can direct radio transceiver 208 to switch operating channel 220 to frequency channel 128B in response to the second event. In one embodiment, fourth program instructions 246 can determine whether first channel identifier 228 identifies operating channel 220. In another embodiment, fourth program instructions 246 can determine whether second channel identifier 230 identifies operating channel 220. In yet another embodiment, fourth program instructions 246 can direct radio transceiver 208 to switch operating channel 220 to a different channel in response to determining that the event detected by controller 202 is relinquishing event 238. In still another embodiment, fourth program instructions 246 can restrict one or more of switching operating channel 220 to frequency channel 128A in response the first event and switching operating channel 220 to frequency channel 128B in response to the second event.

There is set forth herein a computer system for switching operating channel 220 of radio transceiver 208, the computer system comprising radio transceiver 208, controller 202, computer readable storage medium 204, first program instructions 240, second program instructions 242, and third program instructions 244, wherein first program instructions 240, second program instructions 242, and third program instructions 244 are stored on computer readable storage medium 204 for execution by controller 202. In one embodiment, the computer system further comprises fourth program instructions 246, wherein fourth program instructions 246 are stored on computer readable storage medium 204 for execution by controller 202. There is also set forth herein a computer program product for switching operating channel 220 of radio transceiver 208 of input device 200, input device 200 further comprising controller 202 communicatively coupled to radio transceiver 208, the computer program product comprising computer readable storage medium 204, first program instructions 240, second program instructions 242, and third program instructions 244, wherein first program instructions 240, second program instructions 242, and third program instructions 244 are stored on computer readable storage medium 204. In one embodiment, the computer program product further comprises fourth program instructions 246, wherein fourth program instructions 246 are stored on computer readable storage medium 204.

Referring now to FIGS. 4A-4E, various embodiments of input device 200 are discussed. For the purposes of illustrating these embodiments, radio transceiver 102A monitors frequency channel 128A of "8", and radio transceiver 102B monitors frequency channel 128B of "10". In addition, for the purposes of illustrating these embodiments, input device 200 can be configured via one or more of configuration applications 118A and 118B such that first channel identifier 228 is "8" and second channel identifier 230 is "10". In each of the embodiments described with respect to FIGS. 4A-4C, in response to receiving second user input 226 from switching device 212, controller 202 can execute switching logic 226 to determine whether second user input 226 corresponds to the first event, identified by first event identifier 232, or to the second event, identified by second event identifier 234. In the each of the embodiments described with respect to FIGS. 4D-4E, input device 200 can be devoid of switching device 212. Instead of controller 202 executing switching logic 226 in response to receiving second user input 224, controller 202 can advantageously and automatically execute switching logic 226 in response to detecting an occurrence of the first event or the second event.

In each of the embodiments shown in FIGS. 4A-4E, in response to the first event, switching logic 226 can determine whether first channel identifier 228 of "8" identifies operating channel 220 and, in response to determining that first channel identifier 228 of "8" does not identify operating channel 220, to direct radio transceiver 208 to switch operating channel 220 to frequency channel 128A of "8" so that input device 200 can be utilized to insert data into computer system 100A. In response to the second event, switching logic 226 can determine whether second channel identifier 230 of "10" identifies operating channel 220 and, in response to determining that second channel identifier 230 of "10" does not identify operating channel 220, to direct radio transceiver 208 to switch operating channel 220 to frequency channel 128B of "10" so that input device 200 can be utilized to insert data into computer system 100B.

Figure 4A:
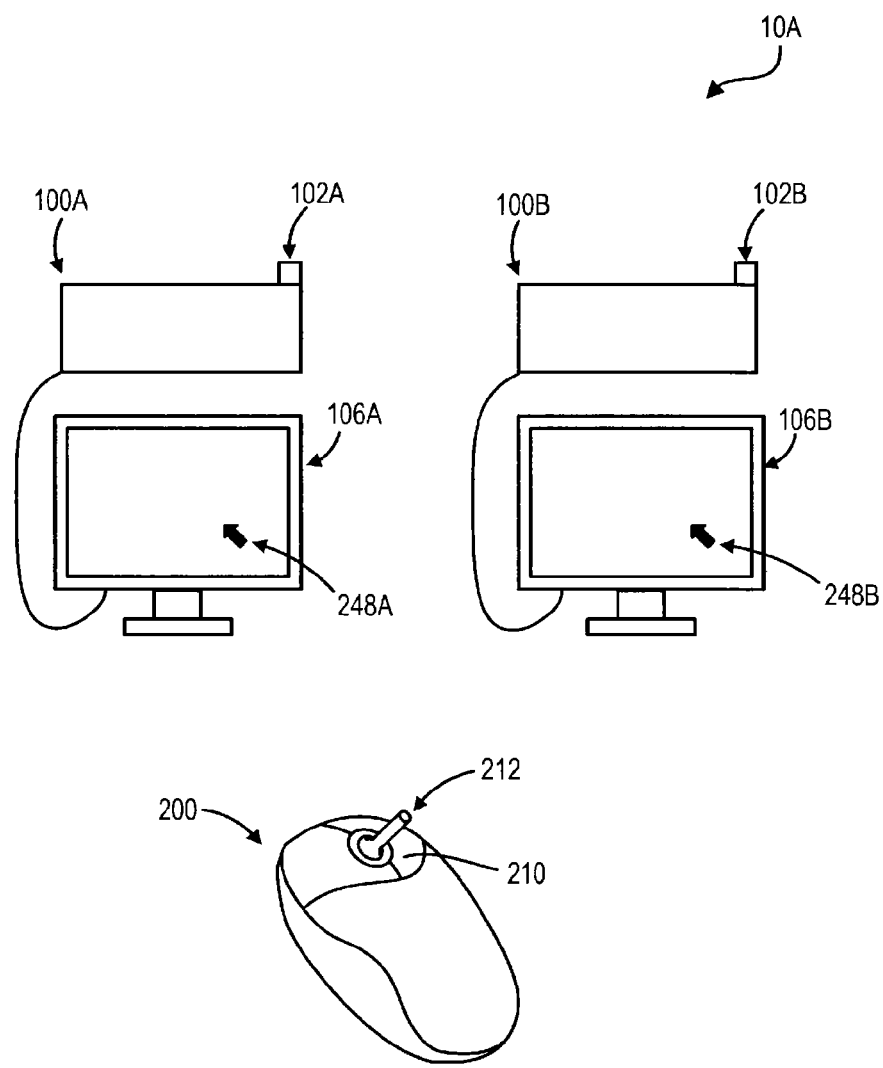
FIGS. 4A-4E are illustrations of systems according to embodiments of the present invention.

Turning to FIG. 4A, in embodiments of system 10A, switching device 212 can be a joystick or track ball, input device 200 can be a wireless mouse, and input device 200 can further be configured via one or more of configuration applications 118A and 118B such that first event identifier 232 identifies the first event of moving switching device 212, e.g., to the left, toward computer system 100A or toward display device 106A, and second event identifier 234 identifies the second event of moving switching device 212, e.g., to the right, toward computer system 100B or toward display device 106B. In response to radio transceiver 208 switching operating channel 220 to frequency channel 128A of "8", input device 200 can be utilized to insert data into computer system 100A via cursor 248A displayed on display device 106A, and display device 106B can be devoid of cursor 248B. In response to radio transceiver 208 switching operating channel 220 to frequency channel 128B of "10", input device 200 can be utilized to insert data into computer system 100B via cursor 248B displayed on display device 106B, and display device 106A can be devoid of cursor 248A. One of skill in the art will also appreciate that in embodiments wherein more than two computer systems have display devices arranged in configurations other than as shown in FIG. 4A, e.g., the display devices are wall-mounted in a 2×2 configuration, input device 200 can be similarly configured such that, e.g., first event identifier 232 identifies the event of moving switching device 212, e.g., to the upper-left so that input device 200 can be utilized to insert data into the computer system communicatively coupled to the display located at the top-left of the 2×2 configuration.

Similarly, in embodiments of system 10B, first event identifier 232 can identify the first event of moving switching device 212, e.g., to the left or toward computer system 100A, and second event identifier 234 can identify the second event of moving switching device 212, e.g., to the right or toward computer system 100B. In response to radio transceiver 208 switching operating channel 220 to frequency channel 128A of "8", input device 200 can be utilized to insert data into computer system 100A via cursor 248A displayed on display device 106A. In response to radio transceiver 208 switching operating channel 220 to frequency channel 128B of "10", input device 200 can be utilized to insert data into computer system 100B via cursor 248A displayed on display device 106A.

Figure 4B:
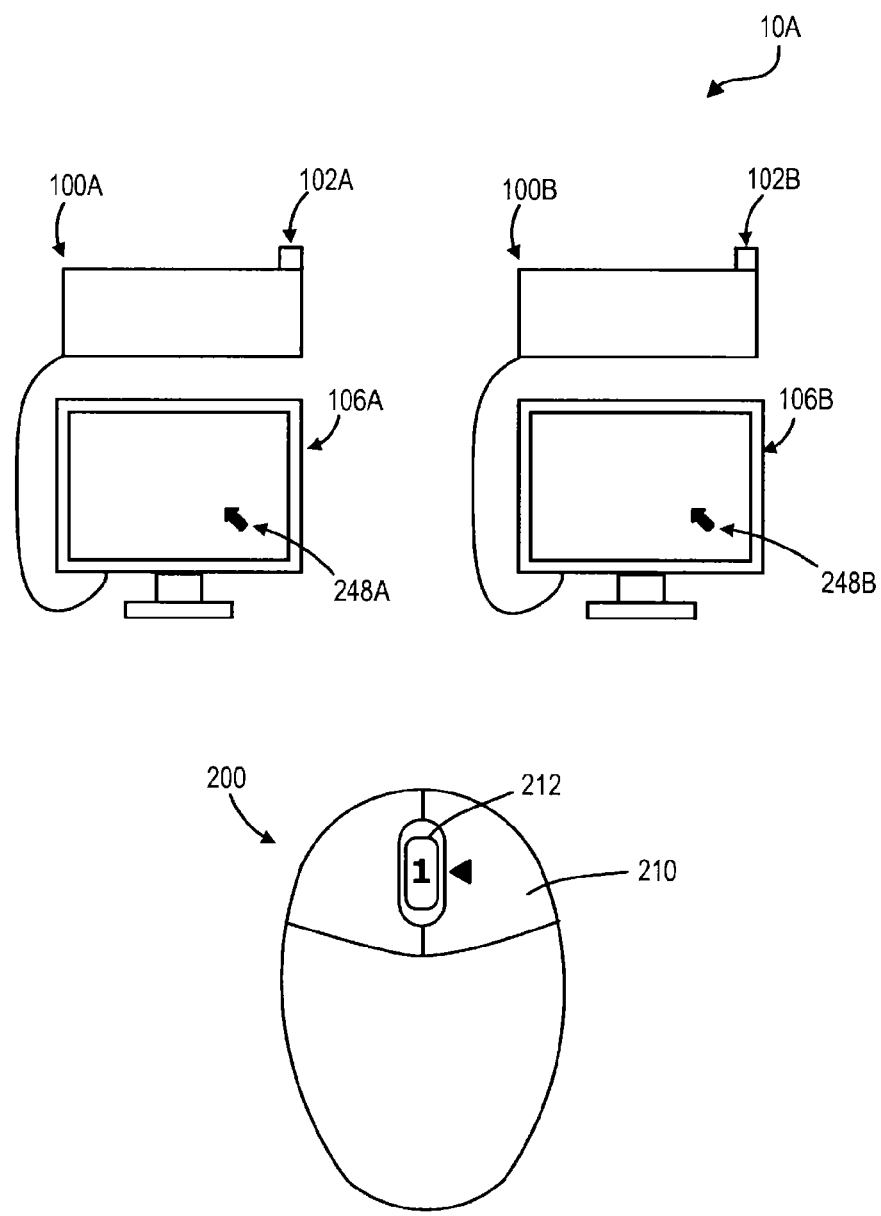

Referring to FIG. 4B, in embodiments of system 10A, switching device 212 can be a scroll wheel, input device 200 can be a wireless mouse, and input device 200 can be further configured via one or more of configuration applications 118A and 118B such that first event identifier 232 identifies the first event of moving switching device 212 such that, e.g., the number "1", representing computer system 100A is selected, and second event identifier 234 identifies the second event of moving switching device 212 such that, e.g., the number "2", representing computer system 100B, is selected. In response to radio transceiver 208 switching operating channel 220 to frequency channel 128A of "8", input device 200 can be utilized to insert data into computer system 100A via cursor 248A displayed on display device 106A, and display device 106B can be devoid of cursor 248B. In response to radio transceiver 208 switching operating channel 220 to frequency channel 128B of "10", input device 200 can be utilized to insert data into computer system 100B via cursor 248B displayed on display device 106A, and display device 106A can be devoid of cursor 248A.

Similarly, in embodiments of system 10B, first event identifier 232 can identify the first event of moving switching device 212 such that, e.g., the number "1", representing computer system 100A, is selected, and second event identifier 234 can identify the second event of moving switching device 212 such that, e.g., the number "2", representing computer system 100B is selected. In response to radio transceiver 208 switching operating channel 220 to frequency channel 128A of "8", input device 200 can be utilized to insert data into computer system 100A via cursor 248A displayed on display device 106A. In response to radio transceiver 208 switching operating channel 220 to frequency channel 128B of "10", input device 200 can be utilized to insert data into computer system 100B via cursor 248A displayed on display device 106A.

Figure 4C:
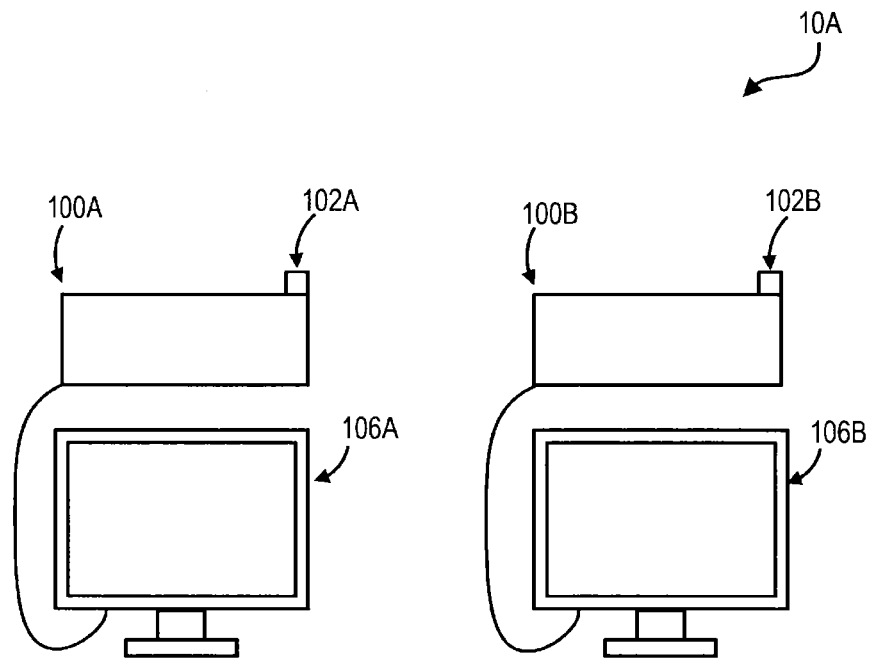
Figure 4C:
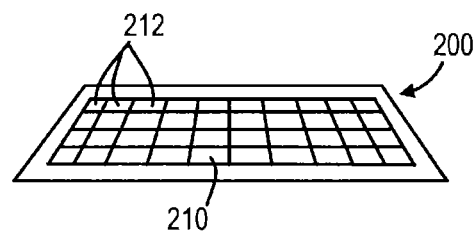

With reference to FIG. 4C, in embodiments of system 10A, switching device 212 can be one or more input mechanisms 210, e.g., keys, input device 200 can be a wireless keyboard, and input device 200 can be further configured via one or more of configuration applications 118A and 118B such that first event identifier 232 identifies the first event of moving switching device 212 a first time, and second event identifier 234 identifies the second event of moving switching device 212 a second time. The switching device 212 can be a different combination of input mechanisms 212 for purposes of the first event identifier 232 and the second event identifier 234. In response to radio transceiver 208 switching operating channel 220 to frequency channel 128A of "8", input device 200 can be utilized to insert data into computer system 100A via a key corresponding to input mechanism 210. In response to radio transceiver 208 switching operating channel 220 to frequency channel 128B of "10", input device 200 can be utilized to insert data into computer system 100B via a key corresponding to input mechanism 210. One of skill in the art will appreciate that input device 200 can operate in the same manner as described above with reference to FIG. 4C in embodiments of system 10B.

Figure 4D:
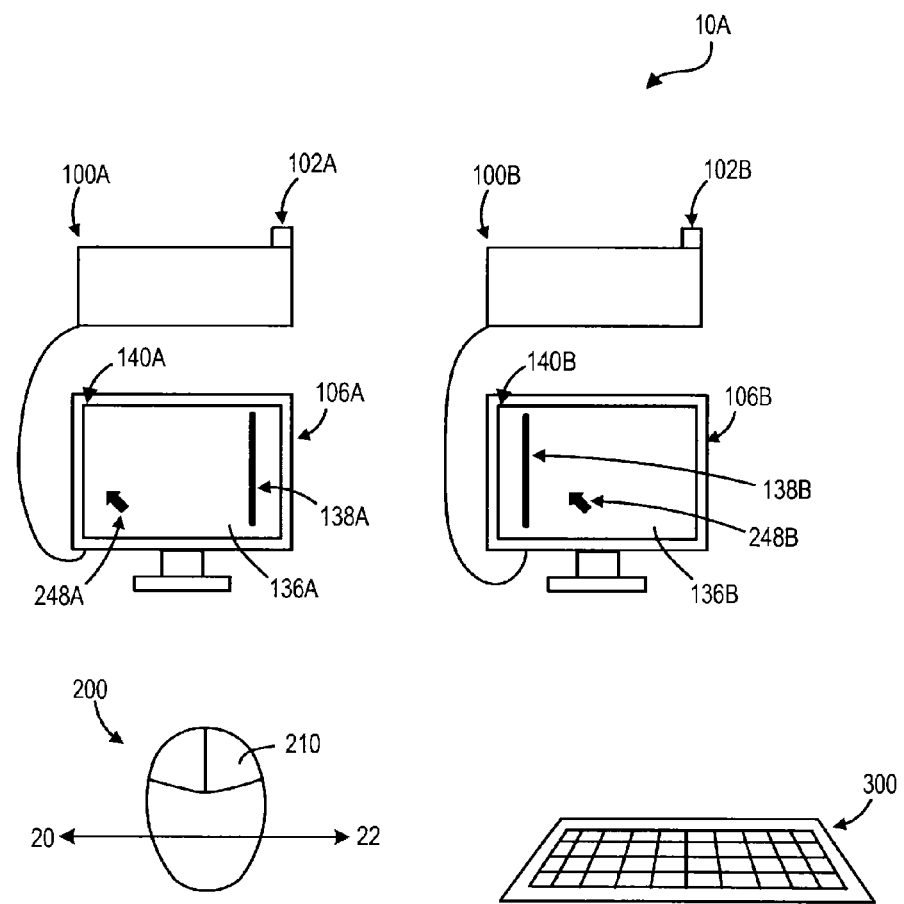

Referring now to FIG. 4D, in embodiments of system 10A, input device 200 can be a wireless mouse. In each embodiment described with respect to FIG. 4D, in response to radio transceiver 208 switching operating channel 220 to frequency channel 128A of "8", input device 200 can be utilized to insert data into computer system 100A via cursor 248A displayed on display device 106A, and display device 106B can be devoid of cursor 248B. In response to radio transceiver 208 switching operating channel 220 to frequency channel 128B of "10", input device 200 can be utilized to insert data into computer system 100B via cursor 248B displayed on display device 106B, and display device 106A can be devoid of cursor 248A.

In one embodiment, display device 106A can have a screen resolution 136A and a logical boundary 138A, and display device 106B can have a screen resolution 13313 and a logical boundary 138B. Logical boundaries 138A and 138B can be based on a percentage of the horizontal pixel width of screen resolutions 136A and 136B, respectively. For example, if screen resolution 136A is 800×600 pixels, and screen resolution 136B is 1600×900 pixels, logical boundary 138A can be located along a vertical line of pixels located, e.g., 720 pixels (90% of horizontal pixel width 800) from vertical boundary 140A and logical boundary 138B can be located along a vertical line of pixels located, e.g., 160 pixels (10% of horizontal pixel width 1600) from vertical boundary 140B. Alternatively, logical boundaries 138A and 138B can be a measured distance, e.g., in inches or centimeters, from vertical boundaries 140A and 140B, respectively. Input device 200 can be further configured via one or more of configuration applications 118A and 118B such that first event identifier 232 identifies the first event of moving cursor 248A in a first direction 20, e.g., from right to left, across logical boundary 138B, and second event identifier 234 identifies the second event of moving cursor 248B in a second direction 22, e.g., from left to right, across logical boundary 138A.

In another embodiment, input device 200 can be further configured via one or more of configuration applications 118A and 118B such that first event identifier 232 identifies the first event of the expiration of a first time period (not shown), and second event identifier 234 identifies the second event of the expiration of a second time period (not shown). First time period and second time period can be, e.g., one-tenth of a second, such that every one-tenth of a second, controller 202 will execute switching logic 226 to direct radio transceiver 208 to switch operating channel 220 from frequency channel 128A to 128B, or vice-versa. In this embodiment, the frequent, time-based switching can have the effect that input device 200 can control the movement of cursor 248A and 248B on display devices 106A and 106B simultaneously.

In yet another embodiment, input device 200 can be further configured via one or more of configuration applications 118A and 118B such that first event identifier 232 identifies the first event of receiving a first signal from an external device, and second event identifier 234 identifies the second event of receiving a second signal from the external device. For example, wireless keyboard 300, which has the components of input device 200 described in FIG. 3, can send a first signal to input device 200 in response to wireless keyboard 300 switching from being operative with computer system 100B to being operative with computer system 100A. Further, wireless keyboard 300 can send a second signal to input device 200 in response to wireless keyboard 300 switching from being operative with computer system 100A to being operative with computer system 100B.

Figure 4E:
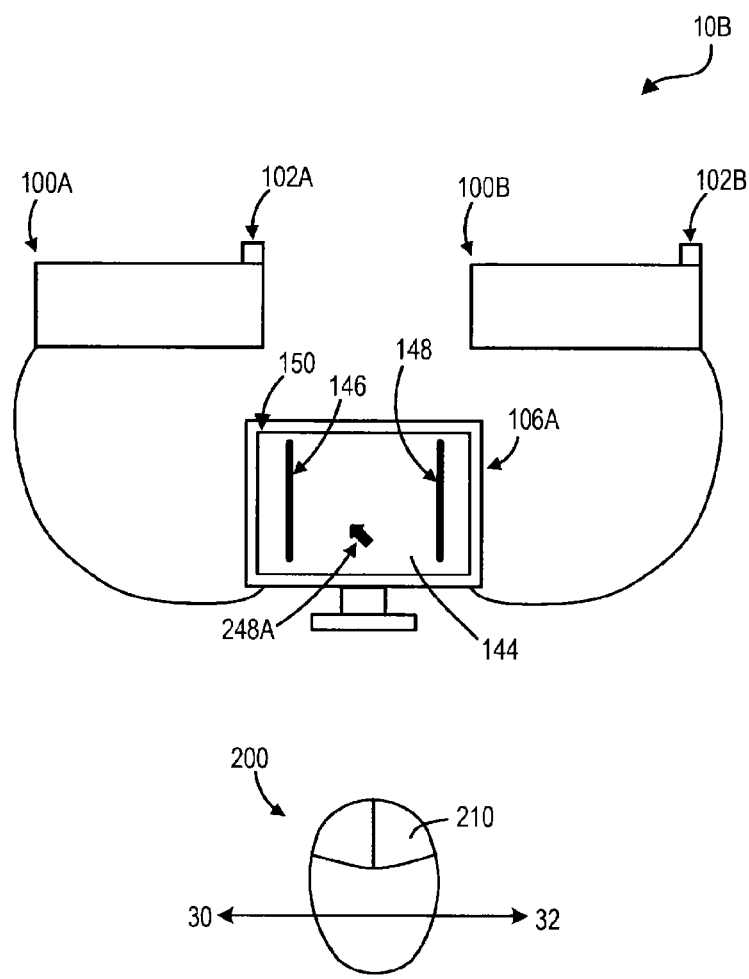

Referring now to FIG. 4E, in embodiments of system 10B, input device 200 can be a wireless mouse. Display device 106A can have a screen resolution 144 and logical boundaries 146 and 148. Logical boundaries 146 and 148 can be based on a percentage of the horizontal pixel width of screen resolution 144. For example, if screen resolution 144 is 800×600 pixels, logical boundary 146 can be located along a vertical line of pixels located, e.g., 80 pixels (10% of horizontal pixel width 800) from vertical boundary 150, and logical boundary 148 can be located along a vertical line of pixels located, e.g., 720 pixels (90% of horizontal pixel width 800) from vertical boundary 150. Alternatively, logical boundaries 146 and 148 can be a measured distance, e.g., in inches or centimeters, from vertical boundary 150. Input device 200 can be further configured via one or more of configuration applications 118A and 118B such that first event identifier 232 identifies the first event of moving cursor 248A in a first direction 30, e.g., from right to left, across logical boundary 146, and second event identifier 234 identifies the second event of moving cursor 248A in a second direction 32, e.g., from left to right, across logical boundary 148. In response to radio transceiver 208 switching operating channel 220 to frequency channel 128A of "8", input device 200 can be utilized to insert data into computer system 100A via cursor 248A displayed on display device 106A. In response to radio transceiver 208 switching operating channel 220 to frequency channel 128B of "10", input device 200 can be utilized to insert data into computer system 100B via cursor 248A displayed on display device 106A.

Figure 5:
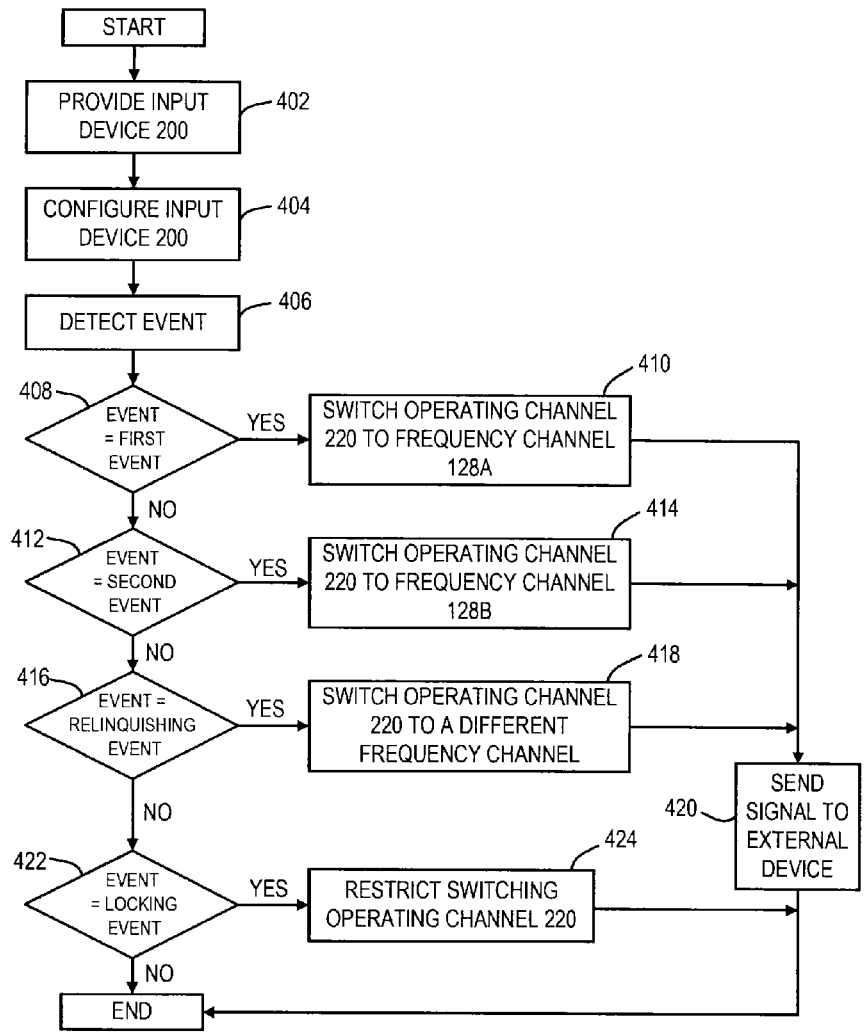
FIG. 5 is a flowchart for the process of switching an operating channel of a radio transceiver of an input device according to an embodiment of the present invention.

FIG. 5 is a flowchart illustrating a method for switching operating channel 220 of radio transceiver 208 of input device 200 according to one embodiment of the present invention. At block 402, input device 200 can be provided. At block 404, input device 200 can be configured so that one or more of first channel identifier 228, second channel identifier 230, first event identifier 232, second event identifier 234, locking event identifier 236, and relinquishing event identifier 238 are stored in input device 200, e.g., in computer readable storage medium 204. First channel identifier 228 can identify frequency channel 128A, second channel identifier 230 can identify frequency channel 128B, first event identifier 232 can identify the first event, second event identifier 234 can identify the second event, locking event identifier 236 can identify the locking event, and relinquishing event identifier 238 can identify the relinquishing event. Input device 200 can be configured using one or more of configuration applications 118A and 118B.

At block 406, input device 200 can detect an occurrence of an event. At block 408, controller 202 can execute switching logic 226 to determine whether the event is the first event. In response to determining that the event is the first event, at block 410, controller 202 can execute switching logic 226 to direct radio transceiver 208 to switch operating channel 220 to frequency channel 128A so that input device 200 can be utilized to insert data into computer system 100A. Alternatively, in response to determining that the event is the first event, at block 410, controller 202 can execute switching logic 226 to determine whether first channel identifier 228 identifies operating channel 220 and, in response to determining that first channel identifier 228 does not identify operating channel 220, to direct radio transceiver 208 to switch operating channel 220 to frequency channel 128A so that input device 200 can be utilized to insert data into computer system 100A.

At block 412, controller 202 can execute switching logic 226 to determine whether the event is the second event. In response to determining that the event is the second event, at block 414, controller 202 can execute switching logic 226 to direct radio transceiver 208 to switch operating channel 220 to frequency channel 128B so that input device 200 can be utilized to insert data into computer system 100B. Alternatively, in response to determining that the event is the second event, at block 414, controller 202 can execute switching logic 226 to determine whether second channel identifier 230 identifies operating channel 220 and, in response to determining that second channel identifier 230 does not identify operating channel 220, to direct radio transceiver 208 to switch operating channel 220 to frequency channel 128B so that input device 200 can be utilized to insert data into computer system 100B. At block 416, controller 202 can execute switching logic 226 to determine whether the event is the relinquishing event. In response to receiving the relinquishing event, at block 418, controller 202 can execute switching logic 226 to direct radio transceiver 208 to switch operating channel 220 to a different frequency channel. At block 420, input device 200 can send a signal to an external device. The purpose of the signal can be to notify the external device of the switching of operating channel 220. At block 422, controller 202 can execute switching logic 226 to determine whether the event is the locking event. In response to receiving the locking event, at block 424, controller 202 can execute switching logic 226 to restrict one or more of switching operating channel 220 to frequency channel 128A in response to the first event and switching operating channel 220 to frequency channel 128B in response to the second event.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method for switching an operating channel of a radio transceiver, the method comprising:
    a first input device receiving a signal from a second input device having priority over the first input device to communicate with a first computer system, the first input device having a radio transceiver operating at a channel, the channel being the same as a channel monitored by a radio transceiver of the first computer system; and
    in response to said receiving, the first input device switching the channel of the radio transceiver of the first input device to a channel that is different than the channel monitored by the radio transceiver of the first computer system, wherein the channel that is different is monitored by a radio transceiver of a second computer system, and wherein said switching is performed without the input device terminating or establishing signals between the first computer system and a display device communicatively coupled to the first computer system and without terminating or establishing signals between the second computer system and a display device communicatively coupled to the second computer system.

2. The method of claim 1, further comprising:
    the first input device detecting an event;
    the first input device determining that the detected event is identified by an event identifier, and in response, the first input device switching the channel of the radio transceiver of the input device from the channel monitored by the radio transceiver of the second computer system to the channel monitored by the radio transceiver of the first computer system.

3. The method of claim 2, wherein the event comprises movement of a cursor across a logical boundary of a display device.

4. The method of claim 2, wherein the event comprises expiration of a time period.

5. The method of claim 2, wherein the event comprises movement of a switching device coupled to the first input device.

6. The method of claim 5, wherein said movement is in a direction toward the first computer system.

7. The method of claim 5, wherein said movement is in a direction toward the display device communicatively coupled to the first computer system.

8. The method of claim 1, further comprising:
    the first input device detecting a first event;
    the first input device determining that the detected first event is identified by an event identifier, and in response, the first input device restricting switching the channel of the radio transceiver of the first input device from the channel monitored by the radio transceiver of the second computer system to the channel monitored by the radio transceiver of the first computer system in response to a second event.

9. The method of claim 8, further comprising:
    further in response to said determining that the detected first event is identified by an event identifier, the first input device restricting switching the channel of the radio transceiver of the first input device from the channel monitored by the radio transceiver of the first computer system to the channel monitored by the radio transceiver of the second computer system in response to a third event.

* * * * *